United States Patent
Fux et al.

(10) Patent No.: US 7,711,542 B2
(45) Date of Patent: May 4, 2010

(54) SYSTEM AND METHOD FOR MULTILANGUAGE TEXT INPUT IN A HANDHELD ELECTRONIC DEVICE

(75) Inventors: Vadim Fux, Waterloo (CA); Michael Elizarov, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1642 days.

(21) Appl. No.: 10/930,639

(22) Filed: Aug. 31, 2004

(65) Prior Publication Data

US 2006/0047498 A1  Mar. 2, 2006

(51) Int. Cl.
G06F 17/28 (2006.01)
G06F 17/00 (2006.01)
B41J 5/00 (2006.01)
H03M 11/00 (2006.01)

(52) U.S. Cl. .......... 704/3; 704/2; 704/8; 715/261; 715/264; 400/109; 341/22

(58) Field of Classification Search .......... 704/3, 704/8, 2; 400/109; 341/22; 715/261, 264
See application file for complete search history.

(56) References Cited

U.S. PATENT DOCUMENTS

| | | | | |
|---|---|---|---|---|
| 5,634,134 | A * | 5/1997 | Kumai et al. ......... | 715/223 |
| 5,818,437 | A * | 10/1998 | Grover et al. ......... | 715/811 |
| 6,205,418 | B1 * | 3/2001 | Li et al. ............. | 704/8 |
| 6,307,548 | B1 | 10/2001 | Flinchem et al. | |
| 6,307,549 | B1 | 10/2001 | King et al. | |
| 6,631,501 | B1 * | 10/2003 | Jurion et al. .......... | 715/257 |
| 6,885,317 | B1 * | 4/2005 | Gutowitz ............. | 341/22 |
| 7,061,403 | B2 * | 6/2006 | Fux ................... | 341/28 |
| 7,283,065 | B2 * | 10/2007 | Scott et al. ........... | 341/22 |
| 7,286,115 | B2 * | 10/2007 | Longe et al. .......... | 345/168 |
| 7,580,829 | B2 * | 8/2009 | James et al. .......... | 704/2 |
| 2002/0126097 | A1 | 9/2002 | Savolainen | |
| 2002/0196163 | A1 | 12/2002 | Bradford et al. | |
| 2004/0006455 | A1 | 1/2004 | Fux et al. | |

(Continued)

FOREIGN PATENT DOCUMENTS

EP   1 031 913 A2   8/2000

(Continued)

OTHER PUBLICATIONS

EIC_Search_Report_10930639.*

(Continued)

*Primary Examiner*—David R Hudspeth
*Assistant Examiner*—Edgar Guerra-Erazo
(74) *Attorney, Agent, or Firm*—Finnegan, Henderson, Farabow, Garrett & Dunner, LLP

(57) ABSTRACT

A system provides multilanguage text input in a handheld electronic device. The system includes one or more applications implemented in the handheld electronic device. The applications include a text input application requiring access to language data usable thereby. One or more language databases contain language data from a plurality of different languages usable by at least one of the applications including the text input application. An interface provides the applications with access to at least some of the different languages of the language data of the one or more language databases, in order that the applications including the text input application receive the different languages.

16 Claims, 4 Drawing Sheets

U.S. PATENT DOCUMENTS

| | | | |
|---|---|---|---|
| 2004/0044422 A1 | 3/2004 | Fux et al. | |
| 2004/0165924 A1* | 8/2004 | Griffin | 400/486 |
| 2005/0060448 A1* | 3/2005 | Gutowitz | 710/72 |
| 2005/0198023 A1* | 9/2005 | James et al. | 707/4 |
| 2008/0270897 A1* | 10/2008 | Jawerth et al. | 715/261 |

FOREIGN PATENT DOCUMENTS

| | | |
|---|---|---|
| EP | 1 035 712 A2 | 9/2000 |
| WO | WO 98/33111 * | 7/1998 |
| WO | WO 00/43208 A | 7/2000 |
| WO | WO 01/35249 A2 | 5/2001 |
| WO | WO 2004/059459 A1 | 7/2004 |

OTHER PUBLICATIONS

Heslop, B. et al., XP007901499, "Proofing and Researching", Chapter 8, Oct. 2003, pp. 223-249.

* cited by examiner

SYSTEM AND METHOD FOR MULTILANGUAGE TEXT INPUT IN A HANDHELD ELECTRONIC DEVICE

BACKGROUND OF THE INVENTION

1. Field of the Invention

This invention relates generally to handheld electronic devices, and more particularly, to a method and system for inputting different languages among one or more applications, such as a text input application, run by the handheld electronic device.

2. Background Information

Handheld electronic devices are becoming ubiquitous. Examples include, for instance, personal data assistants (PDAs), handheld computers, two-way pagers, cellular telephones, text messaging devices, and the like. Many of these handheld electronic devices incorporate wireless communications, although others are stand-alone devices that do not communicate with other devices.

As these handheld electronic devices have become more popular, there has been a growing demand for more functionality and sophistication. While it has been common to provide multiple functions, such as an address book, spell check and text input, the latter especially has become more complex. This is due at least partially to the trend to make these handheld electronic devices smaller and lighter in weight. A limitation in making them smaller has been the physical size of the keyboard if the keys are to be actuated directly by human fingers. Generally, there have been two approaches to solving this problem. One is to adapt the ten digit keypad indigenous to mobile phones for text input. This requires each key to support input of multiple characters. The second approach seeks to shrink the traditional full keyboard, such as the "qwerty" keyboard, by doubling up characters to reduce the number of keys. In both cases, the input generated by actuation of a key representing multiple characters is ambiguous. Various schemes have been devised to interpret inputs from these multi-character keys. Some schemes require actuation of the key a specific number of times to identify the desired character. Others use software to progressively narrow the possible combinations of letters that could be intended by a specified sequence of keystrokes. This approach uses multiple lists that can contain, for instance, prefixes, generic words, learned words, and the like.

Typically, the various applications have had their own database or databases upon which they draw. Thus, the address book application had its own list of addresses used only for that application, the spell check application had its own database of words, and while the text application could have multiple lists (e.g., word lists; prefix lists; n-gram lists; learning lists) of a particular single language, those lists were only used by that text application. This can lead to duplication of data and an inefficient use of memory, which limits the ability to reduce the size, weight and energy use of the handheld electronic device.

The problem of disambiguation of the text input is even larger when the input might be desired in a number of different languages, such as, for example, English/French or English/Spanish. Switching between the languages to input the words in that language is bulky. Also, the space requirements for the device are higher.

There is room for improvement in systems and methods for multilanguage text input in a handheld electronic device.

SUMMARY OF THE INVENTION

These needs and others are met by the invention, which permits multilanguage text input employing linguistic data in a plurality of different languages using the same script or alphabet (e.g., Latin; Cyrillic). This saves space and does not require switching between different languages during text input.

In accordance with aspects of the invention, one or more applications, including a text input application, in a handheld electric device share one or more different language databases, thereby reducing the burden on memory. Thus, for example, the text input application can use one or more different language databases for multilanguage text input of language data from a plurality of different languages. Generally then, an application can access language data from one, some or all of the different language databases containing language data usable by it.

In accordance with one aspect of the invention, a system for multilanguage text input in a handheld electronic device comprises: at least one application implemented in the handheld electronic device, the at least one application comprising a text input application requiring access to language data usable thereby; at least one language database containing language data from a plurality of different languages usable by at least one of the at least one application including the text input application; and an interface providing the at least one application with access to at least some of the different languages of the language data of the at least one language database, in order that the at least one application including the text input application receives the different languages.

The at least one language database may be a single language database containing blended information from two or more different languages.

The language data may comprise a mixture of a plurality of different languages using the same script or alphabet.

The at least one language database may be a plurality of language databases containing information from a plurality of different languages.

A first one of the different language databases may contain information from a first language of the different languages; and a second one of the different language databases may contain information from a second language of the different languages.

A first one of the different language databases may contain information from a first language of the different languages; and a second one of the different language databases may contain information from a second language and a third language of the different languages.

As another aspect of the invention, a method of multilanguage text input in a handheld electronic device comprises: implementing at least one application in the handheld electronic device, the at least one application comprising a text input application requiring access to language data usable thereby; employing at least one language database containing language data from a plurality of different languages usable by at least one of the at least one application including the text input application; and interfacing the at least one application with at least some of the different languages of the language data of the at least one language database, in order that the at least one application including the text input application receives the different languages.

The method may employ as the at least one language database a single language database including blended information from two or more different languages.

The method may employ as the at least one application the text input application and a spell check application; and include in the different languages of the language data a plurality of words usable by the text input application and the spell check application, and frequency data for the words usable only by the text input application.

The method may input text input including the at least some of the different languages of the language data; and seamlessly provide predictive text without regard to the different languages of the text input.

The method may include with the at least some of the different languages of the language data a mixture of a plurality of different languages using the same script or alphabet.

The method may employ as the at least one language database a plurality of different language databases including information from a plurality of different languages.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention is disclosed in connection with a reduced keyboard 5 and disambiguation of text input, although the invention is applicable to a wide range of applications for handheld electronic devices.

Figure 1:
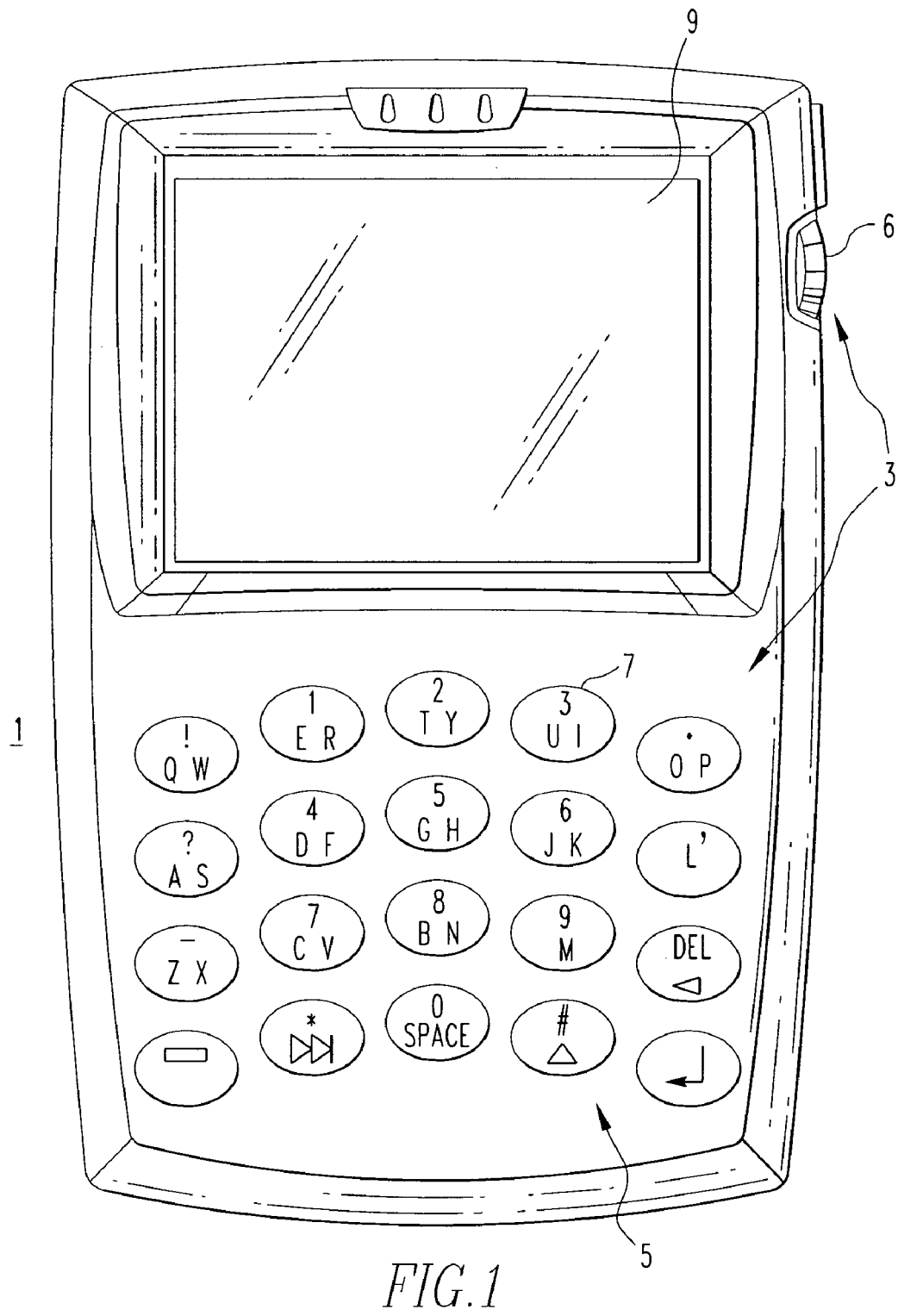
FIG. 1 is a front view of a handheld electronic device incorporating the invention.

FIG. 1 illustrates a wireless handheld electronic device 1, which is but one type of handheld electronic device to which the invention can be applied. The handheld electronic device 1 includes an input device 3 in the form of a keyboard 5 and a thumbwheel 6 that are used to control the functions of a handheld electronic device and to generate text and other inputs. The keyboard 5 constitutes a compressed "qwerty" keyboard in which each of the keys 7 is used to input two or even three letters of the alphabet. Thus, initially the input generated by depressing one of these keys is ambiguous in that it is undetermined as to which letter was intended. As discussed previously, various schemes have been devised for disambiguating the inputs generated by these keys 7 assigned multiple letters for input. The particular scheme used is not relevant to the invention. However, text input applications that use software to progressively narrow the possible combinations of letters that could be intended by a specified sequence of keystrokes use multiple linguistic lists of a particular single language. The inputs provided through the keyboard 5 and thumbwheel 6 are displayed on a display 9 as is well known.

Figure 2:
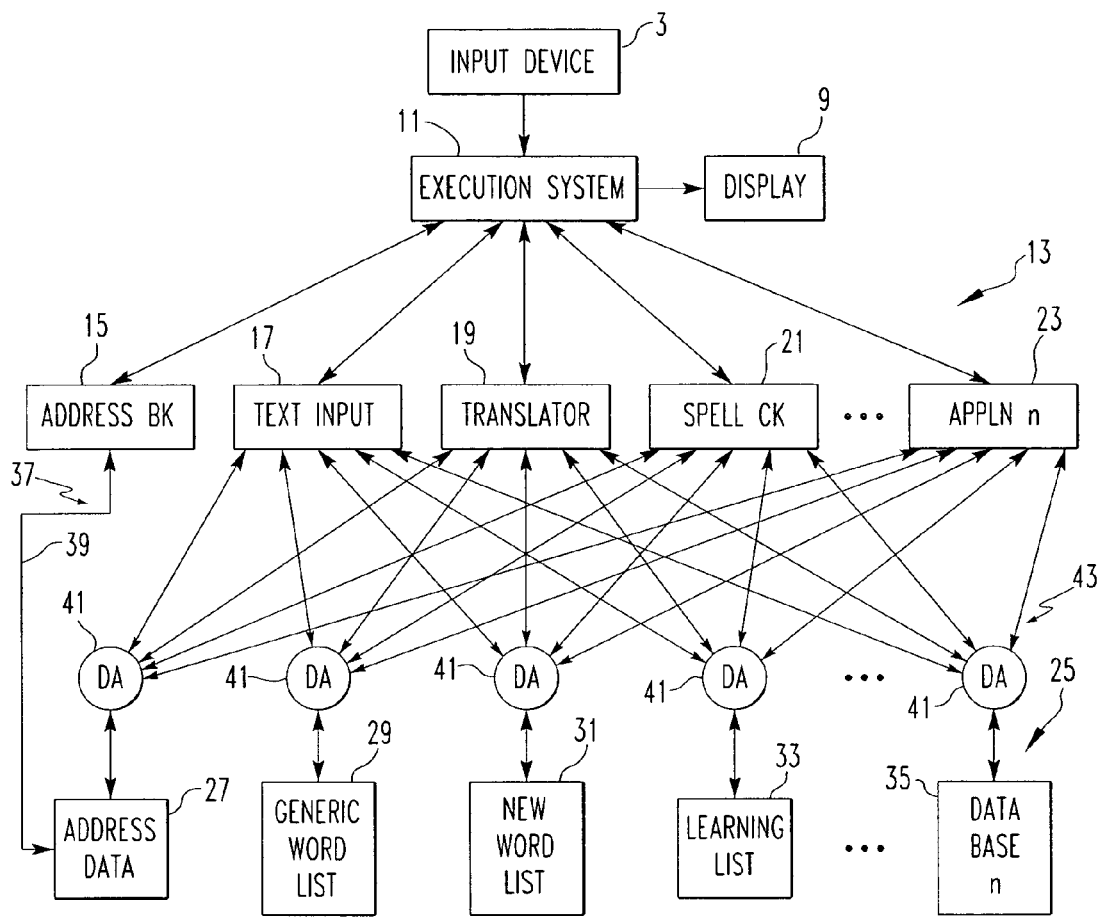
FIG. 2 is a block diagram illustrating the major components of the handheld electronic device of FIG. 1.

Turning to FIG. 2, the input device 3 provides keystroke inputs to an execution system 11 that may be an operating system, a java virtual machine, a run time environment, or the like. The handheld electronic device 1 implements a plurality of applications 13. These applications can include an address book 15, a text input 17, a translation application 19, a spell check application 21 and a number of other applications up to an application n 23.

Each of the applications 13 requires access to data needed for that application to run and produce a meaningful output. Such data is stored in a plurality of databases 25. For example, the address book application 15 requires access to addressee names and mailing addresses and/or e-mail addresses or the like that are stored in the address database 27. The address book application 15 is different from most of the other applications 13 in that it only draws information from the address database 27 as that is the only location for the specific data needed for addressing. Another application that only draws from one database is an auto text application (not shown). An auto text application provides full text for abbreviated inputs, such as "best regards" for "BR" and other shortcut inputs. Such an application improves efficiency by allowing the user to expedite input by only providing a cryptic code for a commonly used word or phrase. Thus, other more general databases cannot provide useful information to the auto text application.

Some applications 13, such as the text input application 17, utilize multiple types of linguistic data. The typical disambiguation type of text input application, for instance, utilizes a generic word list stored in a generic word list database 29. Such text input application can also use a new word list stored in a new word list database 31 and a learning list stored in learning list database 33. Additional lists not shown in FIG. 2 that can be used by the text input application 17 could include a prefix list and an n-gram list. Additional databases 35 (e.g., without limitation, linguistic for one or more different languages) primarily associated with one or more of the additional applications 23 can also be provided.

The text input application 17 in implementing disambiguation displays the variants possible at each stage in the sequence of key inputs, ordered according to frequency of use and with whole words first. Thus, the databases primarily associated with or created for use by the text input application 17 include frequency of use data as part of the linguistic data. This includes, for instance, the generic word list database 29, the new word list database 31 and the learning list database 33.

Databases primarily for one application can be used by other applications. For example, the spell check application 21, which in the exemplary system has no specific databases created especially for it, can utilize data in other databases. Thus, the spell check application draws from the generic word list database 29, the new word list database 31 and the learning list database 33. However, spell check does not need, and therefore does not use, the frequency of use data in these databases. This exemplifies that some databases contain some information that can be used, and some that cannot be used, by a particular application.

On the other hand, the text input application 17 that utilizes frequency of use data, can draw on a database, such as the address database 27, that does not provide frequency of use data. As will be explained, a frequency of use can be automatically assigned where it is absent. Note that the spell check application 21 can also draw on the data stored in the address database 27. No frequency of use is needed by the spell check application 21 and, hence, there is no need to generate such data as in the case of the text input application 17.

Each of the applications 13 communicates with the databases 25 that contains data that the application can use through an interface 37. In the case of the address book application 15, which can only utilize data from the address database 27, a direct connection 39 provides this interface. Such a direct connection, wherein the application can form its request for data and process the responses in a fixed format, is well know. Applications, such as the text input application 17, that can draw on data in multiple databases 25 require as the interface 37 a data adapter 41 associated with each such database and a path 43 between the data adapter and the application. In this arrangement, the application formulates a data request that is forwarded over the appropriate path 43 to the data adapters 41 associated with the plurality of databases 25 containing usable data for the request for data. The data adapter 41 obtains the requested data from the associated database and returns it to the application over the appropriate path 43. Hence, the application can receive in response to a single request for data responses from multiple databases. The application then selects from among the responses returned by multiple databases, such as by eliminating duplicate responses and sorting the responses. The latter can include sorting the responses in accordance with frequency of use.

Figure 3:
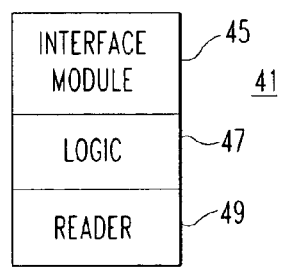
FIG. 3 is a functional diagram of a data adapter which is one of the components illustrated in FIG. 2.

FIG. 3 illustrates the functional organization of the data adapter 41. An interface module 45 receives the request for data from the application 13 and passes it to logic 47 that formulates a query understandable by a reader 49 containing the arguments in the data request from the application. The reader 49 reads the requested data from the associated database 25 and returns it to the logic, which in turn generates a response that is returned to the requesting application 13 by the interface module 45. In generating the response, selected logic 47 can be applied to 30 the results received from the database. For instance, when the requesting application requires frequency of use data, and the database does not contain this information, the logic can assign a frequency of use. In the exemplary data adapter 41, the logic 47 applies a frequency of use in the upper 25% or so of the range of frequencies of use. Other arrangements can be used to assign a frequency of use where needed. Where frequency of use is assigned or is received as part of the results returned by the reader from the database, additional logic, such as sorting according to the frequency of use, can be applied in generating the response. The response generated by the logic is then returned to the requesting application by the interface module.

It can be appreciated from the above, through sharing of multiple databases by multiple applications, the memory resources of a handheld electronic device can be more efficiently employed, thereby making possible a reduction in the size, weight and energy consumption of such devices.

Figure 4:
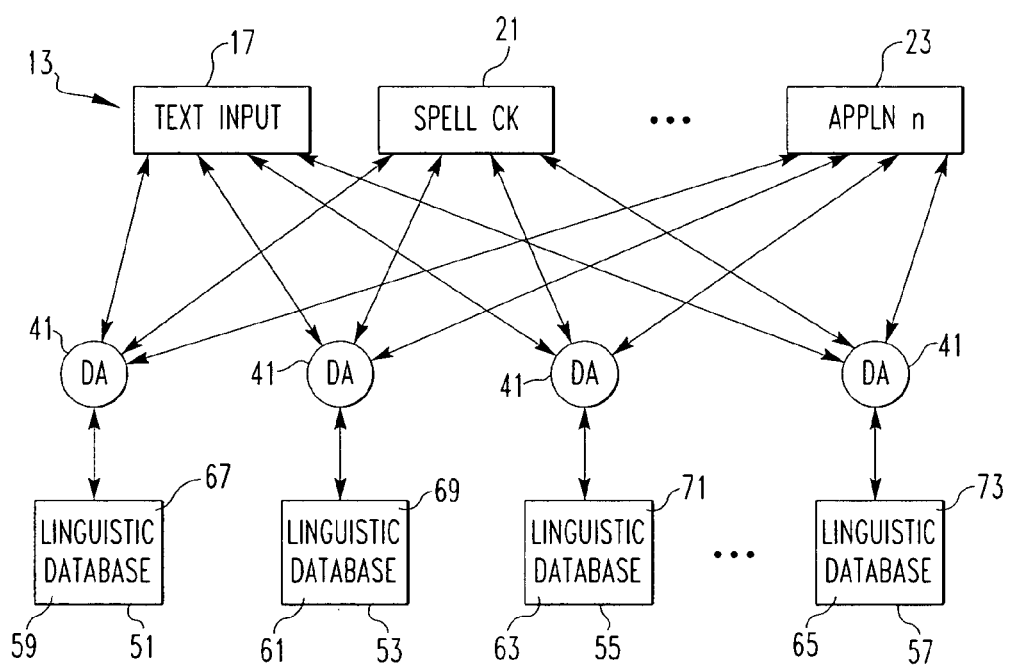
FIG. 4 is a block diagram illustrating other major components of the handheld electronic device of FIG. 1 in accordance with an embodiment of the invention.

The same processing as was discussed above in connection with FIGS. 2 and 3 is involved in dealing with a language dictionary, such as the linguistic database 35. The disclosed method and system allow input from the reduced keyboard 5 of FIG. 1 of the characters from different languages, although a full keyboard (not shown) or other suitable input device may be employed. As shown in FIG. 4, the disclosed method and system provide multilanguage text input using one or more different linguistic databases 51,53,55,57 in the handheld electronic device 1 of FIG. 1. One or more applications 13, including the text input application 17, are implemented in the handheld electronic device 1 and require access to language data usable thereby. Each of the applications, such as, for example, 17, 21 and 23 of FIG. 4, requires access to different language data 59,61,63,65 usable by that application. The different linguistic databases 51,53,55,57 contain respective different language data 59,61,63,65 from a plurality of different languages usable by the applications. The interfaces 41 may, thus, provide one or more of the applications 13 with access to one, some or all of the different linguistic databases 51,53,55,57, in order that those applications, including the text input application 17, receive at least some of the different languages of the language data of the one or more databases.

It will be appreciated that some of the applications 13 may access one, some or all of the different linguistic databases 51,53,55,57 and the respective different language data 59,61, 63,65.

The disclosed method and system provide multilanguage text input of different language data, such as 59,61,63,65, which comprises a mixture between two or more different languages (e.g., without limitation, English, French and German) using the same script or alphabet. Here, there are several examples.

EXAMPLE 1

The first example is one linguistic source 51 containing blended information from two or more different languages (e.g., without limitation, English words. French words and German words, along with frequencies for each of those words).

EXAMPLE 2

The second example is two or more different linguistic sources 53,55 containing the respective different linguistic data 61,63 from two or more different languages. Here, the different linguistic databases 53,55 contain information from a plurality of different languages using the same script or alphabet.

EXAMPLE 3

As a more specific example of Example 2, there may be a first linguistic source 53 containing information 61 from a first language (e.g., without limitation, English) and a second, different linguistic source 55 containing information 63 from a second, different language (e.g., without limitation, German).

EXAMPLE 4

As another more specific example of Example 2, there may be a first linguistic source 53 containing information 61 from a first language (e.g., without limitation, English) and a second, different linguistic source 57 containing information 65 from two or more second, different languages (e.g., without limitation, French and German).

Linguistic data, such as 61, may be created as is discussed, below, in connection with Example 5.

EXAMPLE 5

Figure 5:
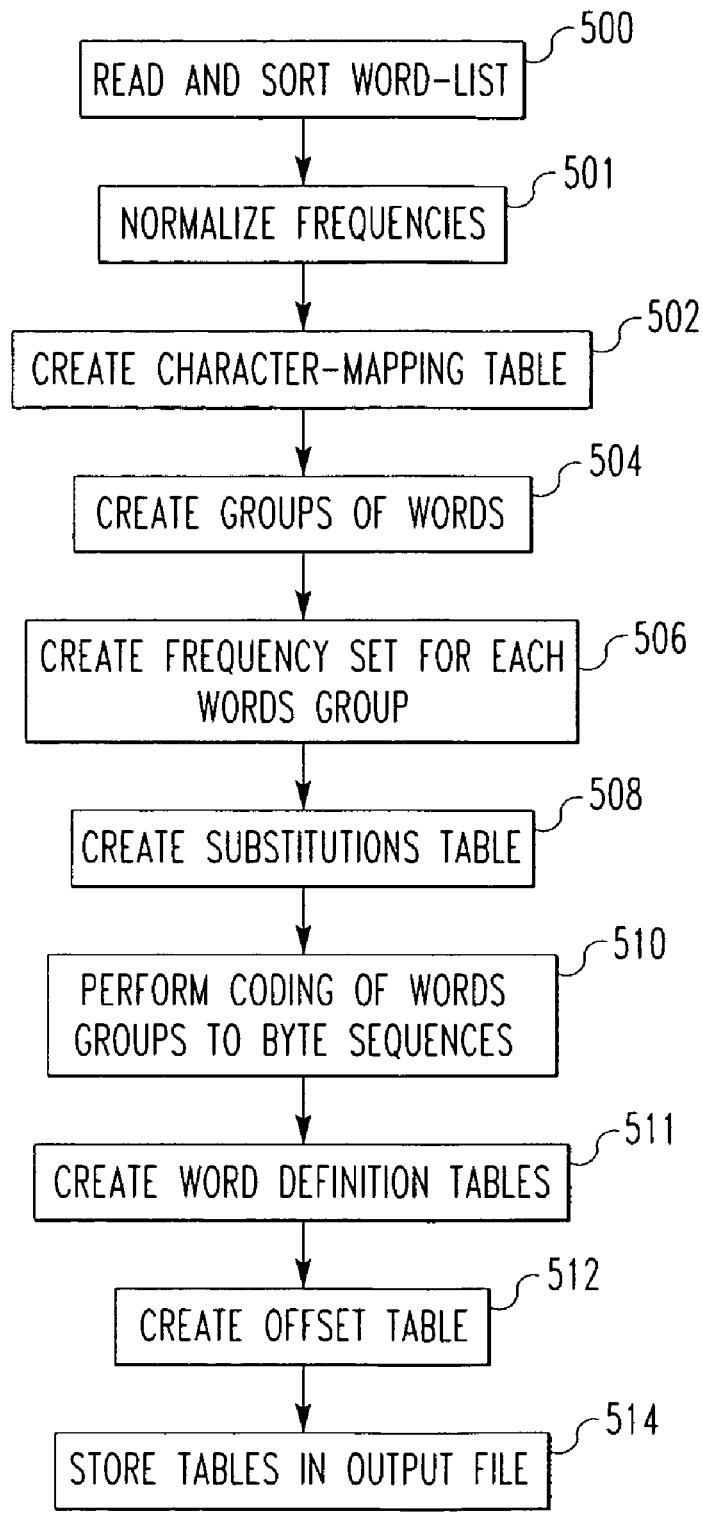
FIG. 5 is a flowchart illustrating a method creating compact linguistic data.

FIG. 5 is a flowchart illustrating a method creating compact linguistic data. The method uses a word-list containing word frequency information to produce compact linguistic data, and includes word prefix indexing and statistical character substitution. See, for example, U.S. patent application Ser. No. 10/289,656.

The method beings at step 500, where the word-list is read from an output file that was produced by a method of word frequency calculation. The words in the word-list are then sorted alphabetically.

The method continues with step 501 of normalizing the absolute frequencies in the word-list. Each absolute frequency is replaced by a relative frequency. Absolute frequencies are mapped to relative frequencies by applying a function, which may be specified by a user. Possible functions include a parabolic, Gaussian, hyperbolic or linear distribution.

The method continues with the step 502 of creating a character-mapping table. The character-mapping table is used to encode words in a subsequent step. When encoding is performed, the characters in the original words are replaced with the character indexes of those characters in the character-mapping table. Since the size of the alphabet for alphabetical languages is much less than 256, a single byte is enough to store Unicode character data. For example, the Unicode character 0x3600 can be represented as 10 if it is located at index 10 in the character-mapping table. The location of a character in the character-mapping table is not significant, and is based on the order that characters appear in the given word-list.

The method continues with the step 504 of separating the words in the word-list into groups. Words in each group have a common prefix of a given length and are sorted by frequency. Words are initially grouped by prefixes that are two characters long. If there are more than 256 words that start with the same two-character prefix, then additional separation will be performed with longer prefixes. For example, if the word-list contains 520 words with the prefix "co", then this group will be separated into groups with prefixes "com", "con", and so on.

The method continues with the step 506 of producing a frequency set for each group of words. In order to reduce the amount of space required to store frequency information, only the maximum frequency of words in each group is retained with full precision. The frequency of each other word is retained as a percentage of the maximum frequency of words in its group. This technique causes some loss of accuracy, but this is acceptable for the purpose of text input prediction, and results in a smaller storage requirement for frequency information.

The method continues with step 508. In order to reduce the amount of data required to store the words in the word-list, the character sequences that occur most frequently in the words are replaced with substitution indexes. The substitution of n-grams, which are sequences of n-number of characters, enables a number of characters to be represented by a single character. This information is stored in a substitution table. The substitution table is indexed, so that each n-gram is mapped to a substitution index. The words can then be compacted by replacing each n-gram with its substitution index in the substitution table each time the n-gram appears in a word.

The method continues with step 510 of encoding the word groups into byte sequences using the character-mapping table and the substitution table, as described above. The prefixes used to collect words into groups are removed from the words themselves. As a result, each word is represented by a byte sequence, which includes all the data required to find the original word, given its prefix.

The method continues with step 511 of creating word definition tables. The word definition tables store the frequency sets calculated at step 506 and the encoded words produced at 510.

The method continues with step 512 of creating an offset table. The offset table contains byte sequences that represent the groups of words. This table enables the identification of the start of byte sequences that represent particular word groups. The offset table is used to locate the byte sequences that comprise the encoded words for a particular group that start with a common prefix.

The method concludes with step 514. At this step, the linguistic data resulting from the method has been stored in the tables that have been created. The data tables, including the character-mapping table, the substitution table, the offset table and the word definition tables, are stored in an output file.

Statistical data gathered during the method of creating compact linguistic data may optionally be stored at step 514. The statistical data includes the frequency with which n-grams stored in the substitution table appear in words in the linguistic data, the number of words in the linguistic data, word-list and corpus from which the word-list was generated, and ratios between the numbers of words in the linguistic data, word-list and corpus.

It will be appreciated that the teachings of Example 5, above, may now be applied to different languages (e.g., English; French; German) using the same script or alphabet.

Examples 6-8, below, include different applications 13 that employ one, some or all of the different linguistic databases 51,53,55,57 of FIG. 4. These applications function in the same manner, except that for text prediction (Examples 6 and 7), the application 17 requests all the words starting from the various possible prefixes, while for disambiguation, the application 17 requests only the most frequent word for each of the possible prefixes.

EXAMPLE 6

The text input application 17 includes text prediction using the reduced keyboard 5 of FIG. 1. At the time of the text input, the system employs one, some or all of the different language data 59,61,63,65 from one, some or all of the different linguistic sources 51,53,55,57 to seamlessly provide predictive text without regard to what language or languages the input text belongs.

EXAMPLE 7

Another text input application, such as 23, includes text prediction using a full keyboard (not shown). Again, at the time of the text input, the system employs one, some or all of the different language data 59,61,63,65 from one, some or all of the different linguistic sources 51,53,55,57 to seamlessly provide predictive text without regard to what language or languages the input text belongs.

EXAMPLE 8

The application 21 includes spell checking. The system includes the text input application 17 and the spell check application 21. The different linguistic databases 51,53,55,57 include a plurality of words usable by the text input application 17 and the spell check application 21, and frequency data 67,69,71,73 for the words usable only by the text input application 17.

While for clarity of disclosure reference has been made herein to the exemplary display 9 for displaying the variants possible at each stage in the sequence of key inputs as well as other output information from the execution system 11, it will be appreciated that such information may be stored, printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A system for multilanguage text input in a handheld electronic device, said system comprising:
    a reduced keyboard implemented in said handheld electronic device;
    at least one application implemented in said handheld electronic device, said at least one application comprising a multilanguage text input application requiring access to language data usable thereby;
    at least one language database containing language data from a plurality of different languages usable by at least one of said at least one application including said multilanguage text input application; and
    an interface providing said at least one application, at the time of said multilanguage text input, with access to at least some of said different languages of said language data of said at least one language database, in order that said at least one application including said multilanguage text input application receives said different languages,
    wherein said multilanguage text input application employs said reduced keyboard,
    wherein said language data comprises a mixture of a plurality of different languages using the same script or alphabet,
    wherein said reduced keyboard includes a plurality of keys, and
    wherein each of a plurality of said plurality of keys includes a plurality of letters from said same script or alphabet.

2. The system of claim 1 wherein said at least one language database is a single language database containing blended information from two or more different languages.

3. The system of claim 1 wherein said at least one application comprises said multilanguage text input application and a spell check application.

4. The system of claim 1 wherein said at least one language database is a plurality of language databases containing information from a plurality of different languages.

5. The system of claim 4 wherein a first one of said different language databases contains information from a first language of said different languages; and wherein a second one of said different language databases contains information from a second language of said different languages.

6. The system of claim 5 wherein said first language is English and said second language is German.

7. The system of claim 4 wherein a first one of said different language databases contains information from a first language of said different languages; and wherein a second one of said different language databases contains information from a second language and a third language of said different languages.

8. The system of claim 7 wherein said first language is English, said second language is French, and said third language is German.

9. A method of multilanguage text input in a handheld electronic device, said method comprising:
    implementing a reduced keyboard in said handheld electronic device;
    implementing at least one application in said handheld electronic device, said at least one application comprising a multilanguage text input application requiring access to language data usable thereby;
    inputting said multilanguage text input from the reduced keyboard;
    employing at least one language database containing language data from a plurality of different languages usable by at least one of said at least one application including said multilanguage text input application;
    interfacing said at least one application, at the time of said multilanguage text input, with at least some of said different languages of said language data of said at least one language database, in order that said at least one application including said multilanguage text input application receives said different languages;
    employing said language data comprising a mixture of a plurality of different languages using the same script or alphabet;
    implementing said reduced keyboard including a plurality of keys; and
    implementing each of a plurality of said plurality of keys including a plurality of letters from said same script or alphabet.

10. The method of claim 9 further comprising
    employing as said at least one language database a single language database including blended information from two or more different languages.

11. The method of claim 9 further comprising
    employing as said at least one application said multilanguage text input application and a spell check application; and
    including in said different languages of said language data a plurality of words usable by the multilanguage text input application and the spell check application, and frequency data for the words usable only by the multilanguage text input application.

12. The method of claim 9 further comprising
    inputting multilanguage text input including said at least some of said different languages of said language data; and
    seamlessly providing predictive text without regard to the different languages of said multilanguage text input.

13. The method of claim 9 further comprising
    employing as said at least one language database a plurality of different language databases including information from a plurality of different languages.

14. The method of claim 13 further comprising
    including with a first one of said different language databases information from a first language of said different languages; and
    including with a second one of said different language databases information from a second language of said different languages.

15. The method of claim 13 further comprising
including with a first one of said different language databases information from a first language of said different languages; and
including with a second one of said different language databases information from a second language and a third language of said different languages.

16. The method of claim 9 further comprising
employing as said at least one application said multilanguage text input application and a spell check application.

* * * * *